United States Patent Office

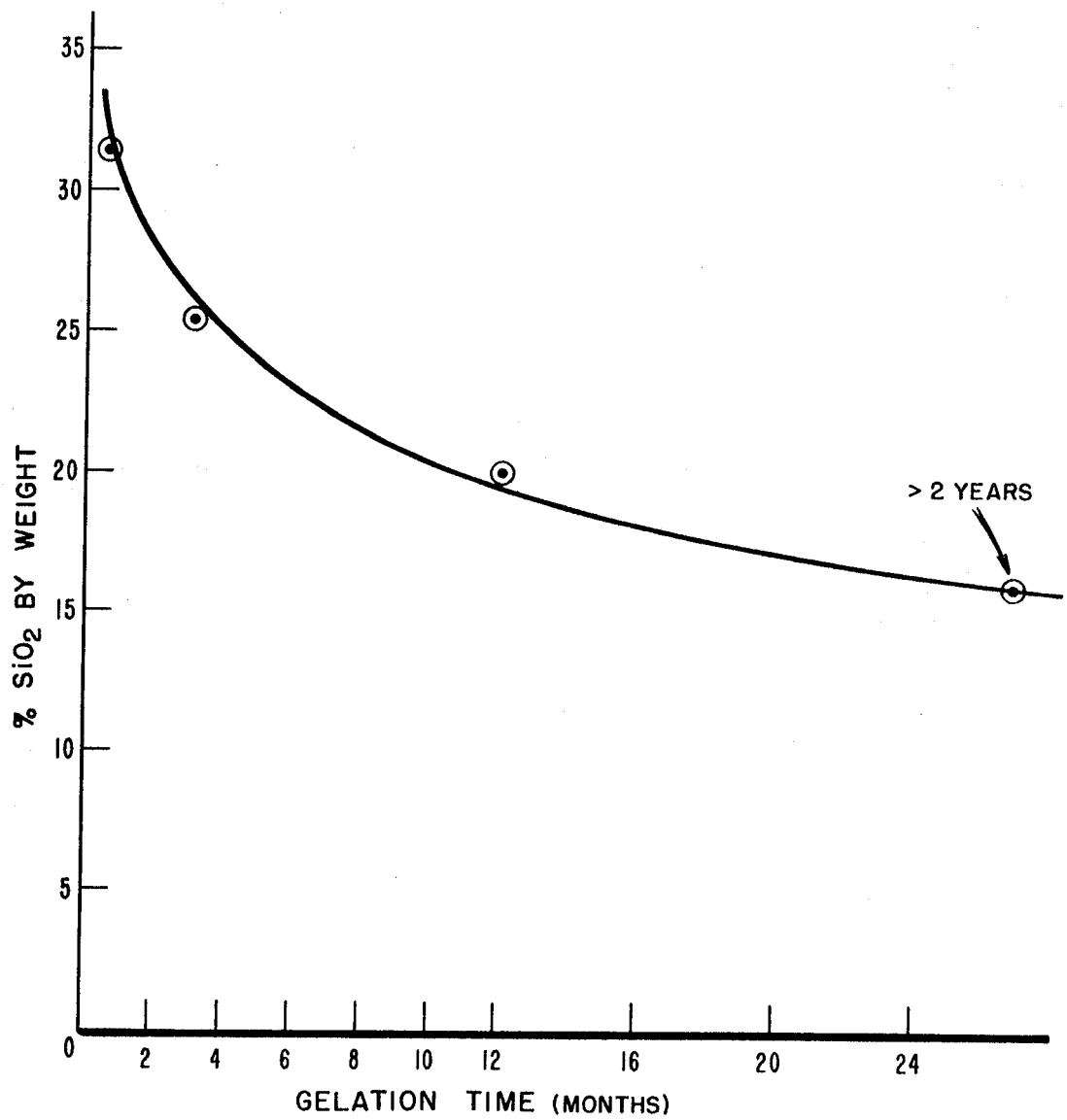

3,660,302
Patented May 2, 1972

3,660,302
ANHYDROUS SILICIC ACID ORGANOSOLS
Milton E. Winyall, Ellicott City, Md., assignor to
W. R. Grace & Co., New York, N.Y.
Filed May 27, 1968, Ser. No. 732,423
Int. Cl. B01j 13/00
U.S. Cl. 252—309                                    9 Claims

ABSTRACT OF THE DISCLOSURE

A process for preparing non-aqueous organosols of low molecular weight silicic acid. Very stable organosols are obtained by adding freshly prepared acidic silica hydrosols to solvents which are strong electron donors and which are free of hydroxyl groups and unsaturation. After removal of water, the resultant anhydrous solutions are very stable and the dissolved silicic acid has an unusually low molecular weight.

---

This invention relates to the preparation of silicic acid. More particularly, this invention relates to anhydrous organosols of low molecular weight silicic acid.

The preparation of silica organosols is well known in the art. U.S. Pats. 2,433,776, 2,433,777, 2,433,778 2,433,779, and 2,433,780 describe a process wherein a water miscible alcohol is added to an acidic silica hydrosol, thereby precipitating the heretofore dissolved salts. Said salts are separated and the water is removed by azeotropic distillation. Another method is described in U.S. Pat. 3,004,920, wherein a ketal is added to react with the water in an acidic hydrosol, thus producing an organosol of silica in a 2:1 (molar) mixture of the alcohol and ketone corresponding to the ketal employed.

However, the presence of hydroxyl group-containing compounds presents one serious drawback. In the presence of an acid or base, silica reacts with alcohols through the silanol group to form ester linkages. This causes a marked reduction in the adsorptive capability of gels resulting from alcohol-containing organosols.

Another problem heretofore unsolved by prior art methods is that of organosol stability. As is well known, silicic acid polymerizes readily from solution to form silica gel. Prior art organosols are at best stable for only several months and the anhydrous organosols of U.S. Pat. 3,004,920 (supra) are stable at room temperature for only several weeks.

It is therefore an object of this invention to provide improved silica organosols.

A further object of this invention is to provide anhydrous silicic acid organosols.

A further object of this invention is to provide organosols of low molecular weight silicic acid which are stable for long periods of time.

Still a further object is to provide organosols of silicic acid wherein said silicic acid is chemically unmodified by the solvent employed as the continuous phase.

These and other objects and advantages will appear obvious from the following detailed description of the invention.

Briefly, this invention comprises forming an essentially anhydrous silicic acid organosol by adding an acidic silica hydrosol to a non-hydric, strongly electron-donating solvent and removing the water therefrom. It has been discovered that when the techniques described herein are closely followed, said resultant anhydrous organosol is characterized by being very stable, i.e. having a room temperature shelf life of about 1 to 24 months, and having a very low molecular weight, i.e. about 15,000 to 500,000 linear silicic acid contained therein.

In the drawing:

The figure is a graph plotting various silica contents in organosols prepared in accordance with this invention versus the times required for said organosols to gel. It is described further in Examples IV–VII.

As used herein, acidic silica hydrosols are prepared by any of the methods known to those skilled in the art. Preferably, the aqueous solution of sodium silicate employed has about 10–35% by weight $SiO_2$ contained therein. Ideally, an aqueous solution of sodium silicate of about 22.8% by weight $SiO_2$ is neutralized with a strong mineral acid, typically 25% $H_2SO_4$, until the solution is at a pH of about 1.3 to 1.7. The thus formed hydrosols are then immediately added to a non-hydric (free of —OH groups), strongly electron-donating organic solvent as described infra.

The non-hydric (free of —OH groups), strongly electron-donating solvents embodied in this invention are dimethyl-sulfoxide, dimethyl formamide, dimethyl acetamide, N-methylpyrrolidone, cyclohexanone, ethylene carbonate, propylene carbonate, and mixtures of these solvents. Mixtures which are especially adaptable to this invention comprise dimethylsulfoxide and one or more of the following: dimethyl formamide, dimethyl acetamide, N-methylpyrrolidone, cyclohexanone, ethylene carbonate, propylene carbonate, and mixtures thereof. Preferably the weight ratio of dimethylsulfoxide to the other solvent component is about 1–3 to 1. (See claim 2.)

One of the many economic and utilitarian advantages inherent to this invention is the ease with which salts dissolved in the hydrosol are removed. These salts, the result of neutralization of alkali metal silicate with a strong mineral acid, are precipitated by adding said hydrosol to the aforementioned non-hydric solvent. The thus precipitated salts can then be easily removed by filtration, centrifugation, decantation, or any other separatory means apparent to those skilled in the art.

Any conventional means may be used to remove the water from the desalted aqueous organosol described supra. Preferably however, the technique of vacuum distillation is employed. This permits the water removal to be accomplished at a relatively low temperature, thereby preventing a considerable increase in the molecular weight of the silicic acid contained in said organosol. It has been found that a pressure of about 5 to 15 mm. Hg results in a distillation temperature of about 0 to 30° C., and that said temperature is ideal for preparing the low molecular weight, essentially anhydrous silicic acid organosols of this invention.

The following examples are provided to further point out and clarify the invention, but are in no way to be construed or interpreted as limiting said invention.

EXAMPLE I

An acidic silica hydrosol was prepared by neutralizing an aqueous solution of sodium silicate with sulfuric acid. The resultant hydrosol had the following composition:

| Component | Percent by wt. | Pounds |
|---|---|---|
| $SiO_2$ | 15.0 | 13.35 |
| $Na_2SO_4$ | 10.5 | 9.4 |
| $H_2SO_4$ | 1.23 | 1.1 |
| Water | 71.77 | 65.15 |

This hydrosol (total weight equals 89 pounds) and 50 pounds of N-methylpyrrolidone were then mixed with stirring. The resultant homogeneous mixture was then let stand for three days during which time sodium sulfate crystallized out of solution. The precipitated sodium sulfate was removed by filtering and was washed with seven pounds of N-methylpyrrolidone. The washings were added to the silicic acid-containing filtrate and this mixture was subjected to evaporation in a Kontros thin film evaporator to effect dehydration. This required three passes through the evaporator at temperatures of 102°, 130°, and 143° F. respectively. After each pass small quantities of sodium sulfate were removed by filtration.

The resultant essentially anhydrous silicic acid organosol had the following composition:

Component: Percent of wt.
    $SiO_2$ ---------------------------------- 17.43
    $Na_2O$ ---------------------------------- 0.024
    $SO_4$ ----------------------------------- 0.04
    $H_2O$ ----------------------------------- 0.47
    N-methylpyrrolidone ---------------------- 82.04

This organosol has a $SiO_2/Na_2O$ ratio of about 727:1.

The above described anhydrous organosol did not gel until after eight months.

EXAMPLE II

To a mixture of 140 g. dimethyl sulfoxide and 160 g. dimethyl acetamide was added 857 g. of acidic silica hydrosol identical to that of Example I. The resulting mixture was allowed to stand for 1 hour and the precipitated sodium sulfate was separated by filtration. The residue was washed with 105 g. of the solvent mixture and the washings were added to the filtrate. The water and residual sodium sulfate were removed as in Example I.

The resultant essentially anhydrous silicic acid organosol analyzed as follows:

Component: Percent of wt.
    Dimethylsulfoxide ------------------------ 40
    Dimethylacetamide ------------------------ 31
    $SiO_2$ ---------------------------------- 26.88
    $Na_2O$ ---------------------------------- 0.08
    $SO_4$ ----------------------------------- 3.11
    $H_2O$ ----------------------------------- 2.4

The above organosol had a silica to sodium ratio of 321:1.

The above described anhydrous organosol did not gel until after about four months.

EXAMPLE III

To a solvent mixture of 50 pounds dimethylsulfoxide and 35 pounds of dimethyl acetamide (about 2.5:1 mole ratio) was added 100 pounds of an acidic silica hydrosol prepared as in Example I. The mixture was aged for about 16 hours and filtered as in Example I. The product anhydrous silicic acid organosol was obtained after evaporation as in Example I and analyzed as follows:

Component: Percent of wt.
    $SiO_2$ ---------------------------------- 14.04
    $Na_2O$ ---------------------------------- 0.05
    $SO_4$ ----------------------------------- 1.26
    $H_2O$ ----------------------------------- 3.1
    Solvent mixture -------------------------- 81.55

The above organosol had a silica to soda ratio of about 239:1.

The above described anhydrous organosol did not gel until after 11 months.

EXAMPLES IV-VII

Several experiments were performed to compare gellation time with silica content. These experiments followed the procedure of Example III. The solvent system employed in these runs was a mixture of dimethylsulfoxide and dimethylacetamide in a weight ratio of about 2:1 respectively, and the silica contents are as indicated in the table below. The figure is a graph of gellation time versus silica content and shows that relative stability increases rapidly as the silica content approaches about 15%.

| Example | Silica (wt. percent) | Gellation time (months) |
|---|---|---|
| IV | 33 | 0.5 |
| V | 26 | 3 |
| VI | 20 | 12 |
| VII | 15 | (1) |

[1] Not gelled after 2 yrs.

I claim:
1. A method for preparing an essentially anhydrous silicic acid organosol, said organosol being prepared by:
    (a) forming an aqueous organosol by adding a strongly acidic mineral acid silica hydrosol to a strongly electron doning water miscible organic solvent free of hydroxyl groups and unsaturation which is selected from the group consisting of dimethyl sulfoxide, dimethyl formamide, dimethyl acetamide, N-methyl pyrrolidone, cyclohexanone, ethyl carbonate, propylene carbonate, and mixtures thereof; thereby causing mineral acid salts dissolved in said hydrosol to precipitate;
    (b) separating said mineral acid salts from said aqueous organosol; and
    (c) removing the water from said aqueous organosol thereby forming an essentially anhydrous silicic acid organosol.
2. The method of claim 1 wherein said organic solvent consists essentially of a mixture of dimethyl sulfoxide and a compound selected from the group consisting of dimethyl formamide, dimethyl acetamide, N-methylpyrrolidone, cyclohexanone, propylene carbonate, ethylene carbonate, and mixtures thereof, the weight ratio of dimethyl sulfoxide to said compound in said mixture being about 1–3 to 1.
3. The method of claim 2 wherein said water is removed from said desalted aqueous organosol by distillation at about 5 to 15 mm. Hg, and about 0 to 30° C.
4. The method of claim 1, wherein the silicic acid in said organosol has a molecular weight of about 15,000 to 500,000.
5. The method of claim 4 wherein said water is removed from said desalted aqueous organosol by distillation at about 5 to 15 mm. Hg, and about 0 to 30° C.
6. The method of claim 4, said organosol being further characterized by remaining ungelled for more than 3 months.
7. The method of claim 4, said organosol being further characterized by remaining ungelled for about 3 to 12 months.
8. An essentially anhydrous silicic acid organosol composition consisting essentially of silicic acid and a strongly electron doning water miscible organic solvent free of hydroxyl groups and unsaturation which is selected from the group consisting of dimethyl sulfoxide, dimethyl formamide, dimethyl acetamide, N-methyl pyrrolidone, cyclohexanone, ethylene carbonate and propylene carbonate.
9. A composition as in claim 8, wherein said organic solvent consists essentially of a mixture of dimethyl sulfoxide and a compound selected from the group consisting of dimethyl formamide, dimethyl acetamide, N-methyl pyrrolidone, cyclohexanone, ethyl carbonate, and propylene carbonate; the weight ratio of dimethyl sulfoxide to said compound in said mixture being about 1–3 to 1.

References Cited
UNITED STATES PATENTS 2,377,841   6/1945   Marshall _____ 252—309
2,383,653   8/1945   Kirk _____ 252—309

JOHN D. WELSH, Primary Examiner